(12) United States Patent
Lyon-Smith

(10) Patent No.: US 8,091,074 B2
(45) Date of Patent: Jan. 3, 2012

(54) EXECUTION-CENTRIC SOURCE CODE VIEW

(75) Inventor: John S. Lyon-Smith, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1230 days.

(21) Appl. No.: 11/820,927

(22) Filed: Jun. 21, 2007

(65) Prior Publication Data

US 2008/0320442 A1 Dec. 25, 2008

(51) Int. Cl.
*G06F 9/44* (2006.01)
(52) U.S. Cl. ........................................ 717/128
(58) Field of Classification Search .......... 717/124, 717/128, 130
See application file for complete search history.

(56) References Cited

U.S. PATENT DOCUMENTS

| | | | |
|---|---|---|---|
| 6,282,701 B1 * | 8/2001 | Wygodny et al. | 717/125 |
| 6,349,406 B1 * | 2/2002 | Levine et al. | 717/128 |
| 6,721,941 B1 | 4/2004 | Morshed et al. | |
| 6,728,949 B1 * | 4/2004 | Bryant et al. | 717/127 |
| 6,748,583 B2 * | 6/2004 | Aizenbud-Reshef et al. | 717/127 |
| 6,857,120 B1 | 2/2005 | Arnold et al. | |
| 7,111,283 B2 | 9/2006 | Fraser et al. | |
| 7,174,536 B1 | 2/2007 | Kothari et al. | |
| 2002/0087949 A1 | 7/2002 | Golender et al. | |
| 2005/0028107 A1 | 2/2005 | Gomes et al. | |
| 2005/0273757 A1 | 12/2005 | Anderson | |
| 2007/0006155 A1 | 1/2007 | Maennel et al. | |
| 2007/0006165 A1 | 1/2007 | Lam et al. | |

OTHER PUBLICATIONS

Cabeza et al., "The Interactive Debugger", Ciao System, Version: 1.10#6, Jul. 8, 2004, pp. 1-11. http://clip.dia.fi.upm.es/Software/Ciao/ciao__html/ciao__8.html.*
"Design and Implementation of a Backward-In-Time Debugger", pp. 1-17, 2006.
"VisiComp", http://www.visicomp.com/product/retrovue/historyview.html, Mar. 9, 2007.
Gestwicki, et al., "Methodology and Architecture of JIVE", pp. 95-104, 2005.
VisiComp, History View, last viewed on Mar. 9, 2007 at http://www.visicomp.com/product/retrovue/historyview.html, 2 pages.

* cited by examiner

*Primary Examiner* — Anna Deng

(57) ABSTRACT

Various technologies and techniques are disclosed for providing an execution-centric view of source code. Source code is reconstructed in an execution-centric format from a prior execution of an application. Trace data is used to determine which code addresses were executed during a prior execution of an application. Addresses in the trace data are mapped back to source code to reconstruct the source code in the execution order. The source code is then displayed in the execution-centric format. Other events that occurred at different points in time can be overlaid in the display of the execution-centric source code.

10 Claims, 9 Drawing Sheets

```
1:   Foo(int n)
2:   {
3:     if (n == 1)
4:       Print("Hello ");
5:     else
6:       Print("World ");
7:   }
8:   Main()
9:   {
10:    for (int i = 0; i < 2; ++i)
11:      Foo(i);
12:  }
```

```
1:   8:   void Main()
2:   9:   {
3:  10:     for (int i = 0;...)
4:  10:     for (...; i < 2; ...)
5:  11:       Foo(i);
  →

6:   1:   Foo(int n)
7:   2:   {
8:   3:     if (n == 1)
                ...
9:   5:     else
10:  6:       Print("World ");
11:  7:   }
  ←
     8:   Main()
     9:   {
12: 10:     for (...; ++i)
            ↑
13: 10:     for (...; i < 2; ...)
```

```
14: 11:     Foo(i);
       →

15: 1:      Foo(int n)
16: 2:      {
17: 3:        if (n == 1)
18: 4:          Print("Hello ");
                ...
19: 7:      }

8:   Main()
       9:   {
              ...
20: 11:       Foo(i);
21: 12:     }
```

FIG. 7B

| DEBUGGING | ←—330 | — ⬜ ✕ |

FILE EDIT VIEW PROJECT BUILD DEBUG DATA TOOLS TEST WINDOW HELP

EXECUTION-CENTRIC SOURCE VIEW

```
309    {
310        COMMANDLINEPARSER PARSER = NEW COMMANDLINE PARSER(
311            TYPEOF (PROGRAMOPTIONS), TYPEOF (CSRRESOURCES),
312
313        COMMANDLINEPARSERFLAGS.PROCESSTOFIRSTDEFAULTARGUMENT)
314        TRY                                                          ↻
315        {
316            PARSER.PARSE(ARGS, OPTIONS);                           ↑338
```

— 336

```
        PUBLIC VOID PARSE(STRING[ ] ARGS, OBJECT TARGET)
1163    }
1164    IF (TARGET == NULL)
1165        THROW NEW ARGUMENTNULLEXCEPTION("TARGET");
1166    }
1175    // FIRST WE GO AND COLLECT THE VALUES FROM THE ACTUAL
1176    ARGUMENT VALUES. ←—340
1177    → PARSEARGUMENTLIST(ARGS);
334
```

```
1202    PRIVATE VOID PARSEARGUMENTLIST(STRING [ ] ARGS)
1203    {
1204        IF (ARGS == NULL)
1205            RETURN
1206
1207        FOREACH (STRING ARGUMENT IN ARGS)
1208    332    IF (ARGUMENT.LENGTH == 0)
1209                CONTINUE
⇒1210        IF (DEFAULTARGUMENT ! = NULL && DEFAULTARGUMENT.SEENVA...
1211        {
1212            // WE HAVE DEFAULT ARGUMENT NOW, EVERYTHING ELSE...
```

CALL STACK

| NAME | LANGUAGE |
|---|---|
| ⇒ CSR.EXE!PROCESSCOMMANDLINE | C# |
| CSR.EXE!PARSE | C# |
| CSR.EXE!PARSEARGUMENTLIST | C# |

| OUTPUT | MODULES | CALL STACK | BREAK | COMMAND | FIND | TEST |
|---|---|---|---|---|---|---|
| AUTOS | THREADS | WATCH 1 | LOCALS | REGISTERS | | |

FIG. 8

EXECUTION-CENTRIC SOURCE CODE VIEW

BACKGROUND

Software developers write software programs using one or more software development languages. In order to determine whether or not a particular software program is performing correctly, or to determine the cause of a particular problem, developers can use a tool called a debugger to step through the code and watch what happens in the program. The running program stops at a particular line of source code, such as when a breakpoint is hit. At that moment, the state of program variables, the stack, and other details can be viewed. Unfortunately, the user is left to determine what path the program took to get to where it is currently stopped at. If the user determines this path incorrectly, they have no way of knowing what the correct program sequence actually was. Since problems within software programs are often caused by an incorrect statement execution sequence, it can be extremely difficult to identify the real cause of the problem.

Some debuggers allow the user to look back at the program stack, but the stack is only valid for the current state of the stopped program, and only contains clues about previous program states. There are some tools that show execution call trees, which are the sequence of functions executed over time. These tools are usually insufficient to debug complex problems, since the actions that occur within a function typically cause the majority of the problems in program execution. Thus, just having the function names in order of execution does not provide much insight.

SUMMARY

Various technologies and techniques are disclosed for providing an execution-centric view of source code. Source code is reconstructed in an execution-centric format from a prior execution of an application. Trace data is used to determine which code addresses were executed during a prior execution of an application. Addresses in the trace data are mapped back to source code to reconstruct the source code in the execution order. The source code is then displayed in the execution-centric format. In one implementation, execution flow and code connections are shown in the execution-centric format.

In one implementation, other events that occurred at different points in time can be overlaid in the display of the execution-centric source code. While processing trace data to generate execution-centric source code, events that happened at one or more points in time that the source code was executed are identified. The events are then correlated to corresponding parts of the source code. The execution-centric source code is then displayed with the events overlaid at respective lines of code where a respective event occurred at a same point in time.

This Summary was provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 6 is a diagram illustrating exemplary source code for a console program.

FIG. 7A-7B are simulated screens for one implementation illustrating some execution-centric source code that is reconstructed from an actual execution of the source code in FIG. 6.

FIG. 8 is a simulated screen for one implementation of the system of FIG. 1 that illustrates a graphical user interface showing an execution-centric source code that is reconstructed from an actual execution of source code.

DETAILED DESCRIPTION

Figure 1:
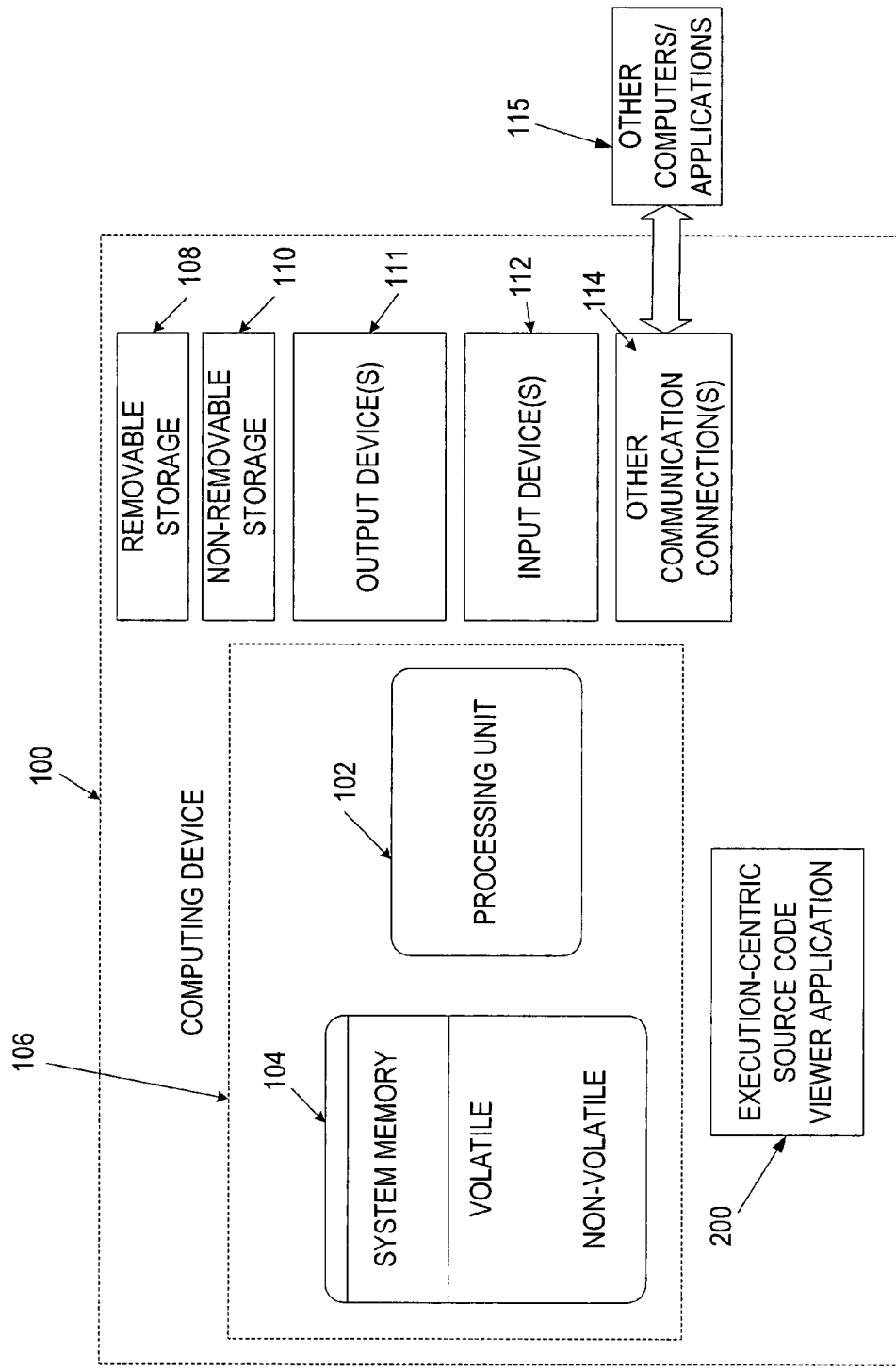
FIG. 1 is a diagrammatic view of a computer system of one implementation.

For the purposes of promoting an understanding of the principles of the invention, reference will now be made to the embodiments illustrated in the drawings and specific language will be used to describe the same. It will nevertheless be understood that no limitation of the scope is thereby intended. Any alterations and further modifications in the described embodiments, and any further applications of the principles as described herein are contemplated as would normally occur to one skilled in the art.

The system may be described in the general context as an application that allows for viewing and/or debugging software applications, but the system also serves other purposes in addition to these. In one implementation, one or more of the techniques described herein can be implemented as features within a software development program such as MICROSOFT® VISUAL STUDIO®, or from any other type of program or service that allows for viewing and/or debugging software applications.

In one implementation, a system is provided that reconstructs the source code from information obtained in a prior execution into an execution-centric format. The term "execution-centric" as used herein is meant to include an order that is based upon the actual order that the source code was executed. This allows a user debugging a particular program to see a list of source code that shows exactly what lines of source code were executed in the prior run of the program. Other information can be shown along with the execution-centric source code, such as symbols that show execution flow and/or code connections, out-of-band events that show what else happened at the same point in time as a particular line of code was executed, etc.

As shown in FIG. 1, an exemplary computer system to use for implementing one or more parts of the system includes a computing device, such as computing device 100. In its most basic configuration, computing device 100 typically includes at least one processing unit 102 and memory 104. Depending on the exact configuration and type of computing device, memory 104 may be volatile (such as RAM), non-volatile (such as ROM, flash memory, etc.) or some combination of the two. This most basic configuration is illustrated in FIG. 1 by dashed line 106.

Additionally, device 100 may also have additional features/functionality. For example, device 100 may also include additional storage (removable and/or non-removable) including, but not limited to, magnetic or optical disks or tape. Such additional storage is illustrated in FIG. 1 by removable storage 108 and non-removable storage 110. Computer storage media includes volatile and nonvolatile, removable and non-removable media implemented in any method or technology for storage of information such as computer readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 100. Any such computer storage media may be part of device 100.

Computing device 100 includes one or more communication connections 114 that allow computing device 100 to communicate with other computers/applications 115. Device 100 may also have input device(s) 112 such as keyboard, mouse, pen, voice input device, touch input device, etc. Output device(s) 111 such as a display, speakers, printer, etc. may also be included. These devices are well known in the art and need not be discussed at length here. In one implementation, computing device 100 includes execution-centric source code viewer application 200. Execution-centric source code viewer application 200 will be described in further detail in FIG. 2.

Figure 2:
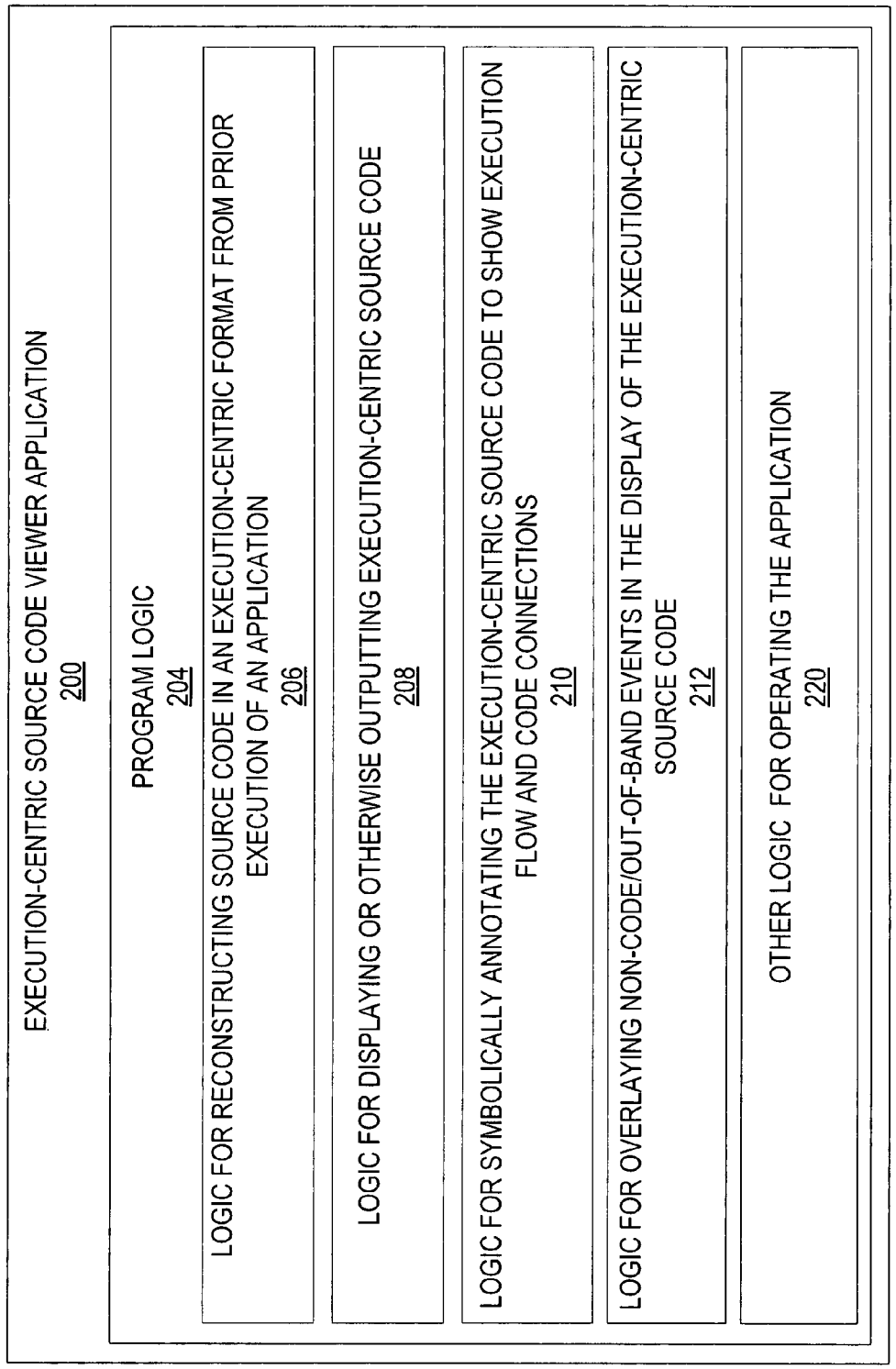
FIG. 2 is a diagrammatic view of an execution-centric source code viewer application of one implementation operating on the computer system of FIG. 1.

Turning now to FIG. 2 with continued reference to FIG. 1, an execution-centric source code viewer application 200 operating on computing device 100 is illustrated. Execution-centric source code viewer application 200 is one of the application programs that reside on computing device 100. However, it will be understood that execution-centric source code viewer application 200 can alternatively or additionally be embodied as computer-executable instructions on one or more computers and/or in different variations than shown on FIG. 1. Alternatively or additionally, one or more parts of execution-centric source code viewer application 200 can be part of system memory 104, on other computers and/or applications 115, or other such variations as would occur to one in the computer software art.

Execution-centric source code viewer application 200 includes program logic 204, which is responsible for carrying out some or all of the techniques described herein. Program logic 204 includes logic for reconstructing source code in an execution-centric format from prior execution of an application 206; logic for displaying or otherwise outputting execution-centric source code 208; logic for symbolically annotating the execution-centric source code to show execution flow and code connections 210; logic for overlaying non-code/out-of-band events in the display of the execution-centric source code 212; and other logic for operating the application 220. In one implementation, program logic 204 is operable to be called programmatically from another program, such as using a single call to a procedure in program logic 204.

Figure 3:
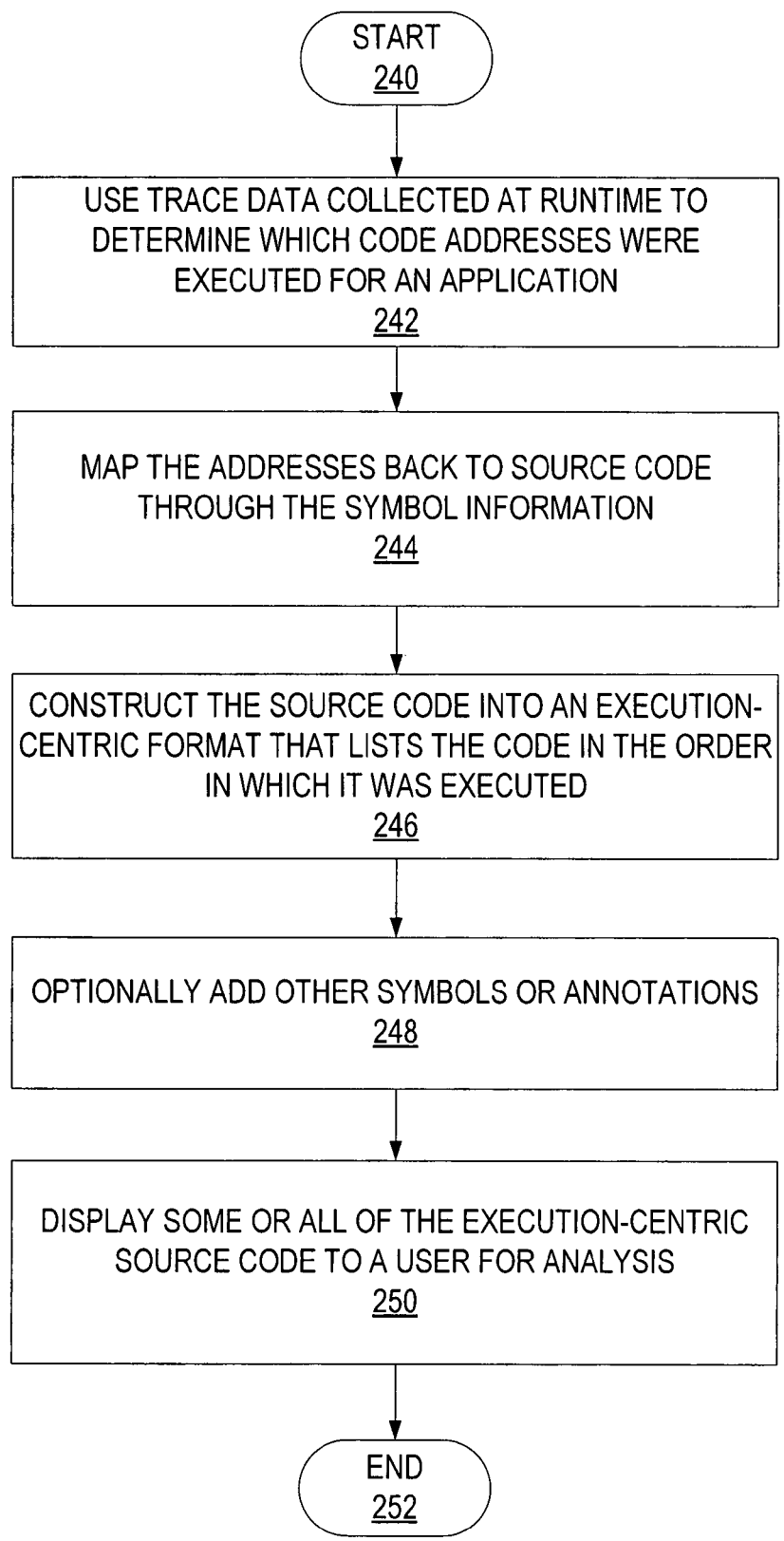
FIG. 3 is a process flow diagram for one implementation of the system of FIG. 1 illustrating the stages involved in reconstructing source code in an execution-centric format from a prior execution of an application.
Figure 4:
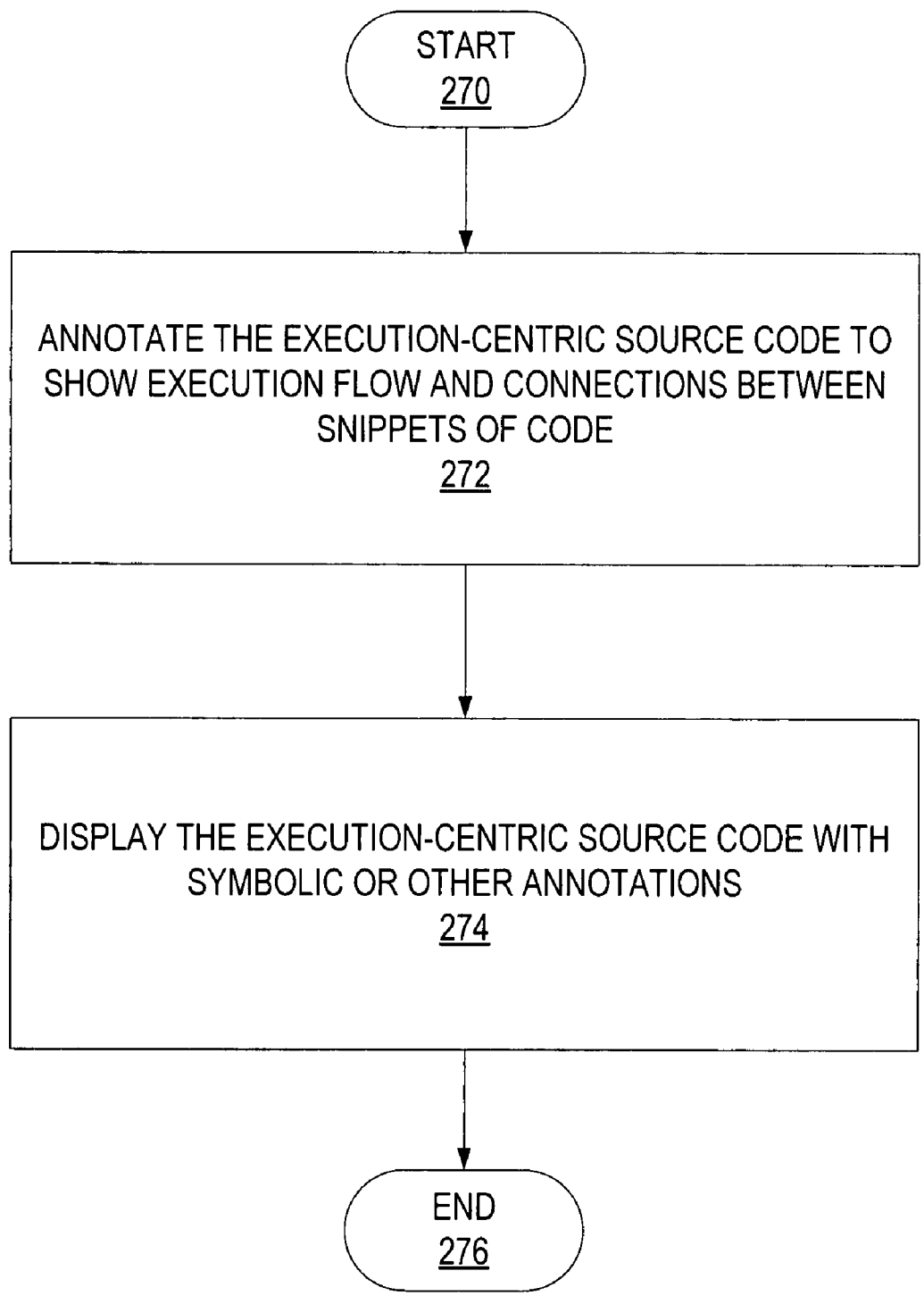
FIG. 4 is a process flow diagram for one implementation of the system of FIG. 1 illustrating the stages involved in symbolically annotating the execution-centric source code to show execution flow and code connections.
Figure 5:
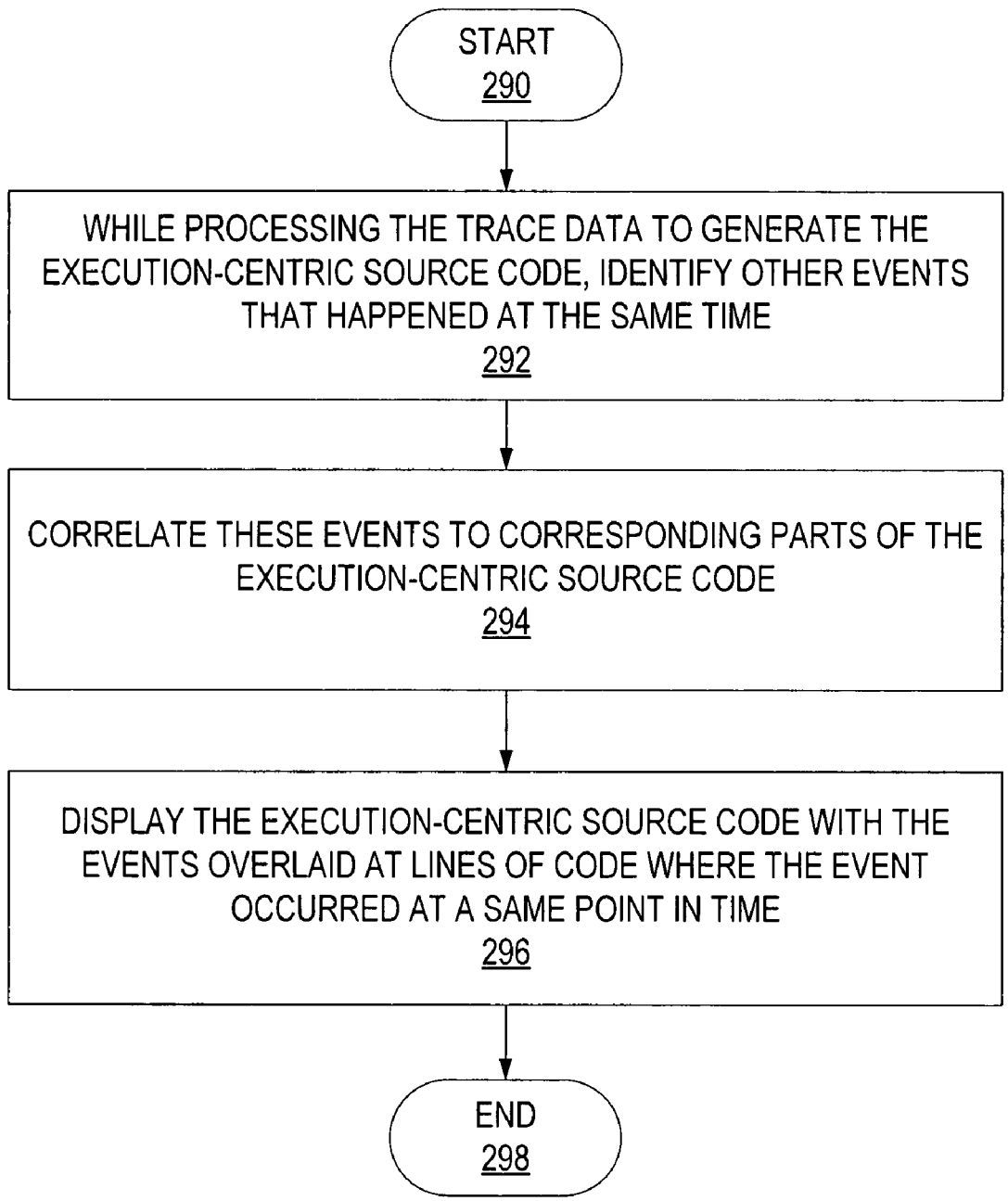
FIG. 5 is a process flow diagram for one implementation of the system of FIG. 1 illustrating the stages involved in overlaying non-code/out-of-band events in the display of the execution-centric source code.

Turning now to FIGS. 3-5 with continued reference to FIGS. 1-2, the stages for implementing one or more implementations of execution-centric source code viewer application 200 are described in further detail. FIG. 3 illustrates one implementation of the stages involved in reconstructing source code in an execution-centric format from a prior execution of an application. In one form, the process of FIG. 3 is at least partially implemented in the operating logic of computing device 100. The process begins at start point 240 with using trace data collected at runtime to determine which code addresses were executed for an application (stage 242). In one implementation, the trace data is from a program that is no longer executing. In another implementation, the trace data is from a program that is currently stopped in a break mode in a debugger or other tool. The system maps the addresses back to the source code through the symbol information (stage 244). The system constructs the source code into an execution-centric format that lists the code in the order in which it was executed (stage 246). The system optionally adds other symbols or annotations to the execution-centric source code (stage 248). The system displays some or all of the execution-centric source code to a user for analysis (stage 250). In one implementation, more lines of code than just those lines that were executed are reconstructed and shown to give further context. In another implementation, the specific lines of code that executed and their function or procedure names are reconstructed and shown, but other details in the function or procedure that were not executed are not included. In yet another implementation, the additional lines of code that were not executed but give additional context are included originally, but can be collapsed into a view that shows just the lines that executed, or some smaller subset of the ones that are already displayed. The process ends at end point 252.

FIG. 4 illustrates one implementation of the stages involved in symbolically annotating the execution-centric source code to show execution flow and code connections. In one form, the process of FIG. 4 is at least partially implemented in the operating logic of computing device 100. The process begins at start point 270 with the system annotating the execution-centric source code to show execution flow and connections between snippets of code (stage 272). The system then displays the execution-centric source code with the symbolic or other annotations (stage 274). A few non-limiting examples of annotations for showing execution flow and/or connections include, but are not limited to, execution sequence numbers, source line numbers from the original source file, bold or other indicators to show lines that actually executed, a symbol to show a return from a method, a symbol to show a call to a method, etc. Some of these are illustrated in further detail in the simulated screens of FIGS. 7 and 8. The process ends at end point 276.

FIG. 5 illustrates one implementation of the stages involved in overlaying non-code/out-of-band events in the display of the execution-centric source code. In one form, the process of FIG. 5 is at least partially implemented in the operating logic of computing device 100. The process begins at start point 290 with processing the trace data to generate the execution-centric source code, and identifying other events that happened at the same time as a particular line of code executed (stage 292). These events are correlated to the corresponding parts of the execution-centric source code (stage 294). The system then displays the execution-centric source code with the events overlaid at lines of code where the event occurred as the same point in time (stage 296). Some non-limiting examples of out-of-band events that can be displayed at a corresponding point in the source code include a garbage collection event, a file being written to disk, a web site being accessed, a call to an external web service, etc.

The process ends at end point 298. These stages will now be described in further detail using some simulated screens to illustrate the concepts.

FIG. 6 is a diagram 300 illustrating exemplary source code for a console program. FIGS. 7A-7B are simulated screens for one implementation illustrating some execution-centric source code that is reconstructed from an actual execution of the source code in FIG. 6. The simulated screens shown in FIGS. 7A-7B (310 and 320) are displayed in a console application that scrolls onto more than one page. FIGS. 7A-7B illustrate the execution-centric source code that was reconstructed from the trace or other details from the prior execution of the program. The lines in bold are those that were executed when the program ran. The first set of line numbers are the line numbers of the program in order as they were executed. The second set of line numbers are the line numbers from the original source code file. The right facing arrow indicates that method was called. The left facing arrow indicates a return from a method. The up facing arrow indicates than a backwards branch was taken in the source code. Any code that is not executed on a line or that is skipped over during execution is shown with an ellipsis. If you follow back up from any snipped of code to the previous right or left facing arrow, the current method is shown on the immediately succeeding line. From this view of the source code, the user can see the complete history on one or more screens that show exactly which lines of source code were executed in the particular program.

FIG. 8 is a simulated screen 330 for one implementation of the system of FIG. 1 that illustrates a graphical user interface showing an execution-centric source code that is reconstructed from an actual execution of source code. FIG. 8 is similar to FIGS. 7A-7B, except it is shown in a more user friendly graphical format. The simulated screen 330 is essentially a virtual source document which provides a program execution timeline. The contents of the document are made up of the combined snippets of source code from the recent execution history of the program (e.g. the execution-centric source code). Each method that was called begins a new section of the document. Sections are marked with dotted lines in the diagram. A new section starts immediately after the invocation of a method; the rest of the method is not shown (because it has not executed yet).

FIG. 8 is shown stopped at a breakpoint. Item 332 indicates the current historical or real debugging context of the executing program. Item 334 indicates the next function on the call stack, and so on. The icon at 336 indicates that source file that contains the method. In one implementation, hovering over the source file shows a tooltip with the name of the source file, and/or double clicking on the icon opens the specific source file positioned correctly to show the same execution context. If this is a read-only recomposition of the source, it allows a variety of interesting graphical possibilities that might not be easy to implement or even desirable for the regular editable text window. For instance, the dotted lines between the methods allow for the partial source section to be rolled up into a smaller line. This allows methods that are not interesting to the developer to be easily ignored. Additionally, item 338 shows possible annotations that could be added to the source because of the availability of historical information. In this case, we are showing that a garbage collection has occurred at the lines shown.

If it is desirable to show as much of the recent execution history as possible, then lines that were not executed around item 340, such as the throw statement at line 1165 as well as the comment at 1175 could even be omitted. Alternatively, they could be grayed out.

The source view would most likely be constructed dynamically and on demand from the currently executing method backwards, and displayed as the executed source was recomposed so that the user would not have to wait to begin viewing it. In one implementation, only a few screens of methods would be generated. In another implementation, all of the screens are made available for viewing. A slightly enhanced scroll bar with an additional "page up" button to move to previous methods not yet contained in the view can be used. For example, this can add the previous methods to the view, or as many methods as there were to the start of the program.

In one implementation, loops could be unrolled within the body of the method. In another implementation, debugger tooltip windows could be shown over the text. In another implementation, the view can be editable, with changes mapped back to the original source files. In yet another implementation, the view can be savable and printable. These are just a few non-limiting examples of the various ways the execution-centric source code could be used, and numerous other variations are also possible.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. All equivalents, changes, and modifications that come within the spirit of the implementations as described herein and/or by the following claims are desired to be protected.

For example, a person of ordinary skill in the computer software art will recognize that the client and/or server arrangements, user interface screen content, and/or data layouts as described in the examples discussed herein could be organized differently on one or more computers to include fewer or additional options or features than as portrayed in the examples.

What is claimed is:

1. A computer-readable storage medium having computer-executable instructions for causing a computer to perform steps comprising:
   processing trace data to determine which code addresses were executed during a prior execution of an application;
   while processing the trace data, identifying one or more events that happened at one or more points in time as the application was executed;
   correlating the one or more events to corresponding parts of the source code;
   mapping addresses in the trace data back to source code through symbol information;
   reconstructing the source code into an execution-centric format, the execution-centric format lists the source code in an order in which it was executed;
   symbolically annotating the execution-centric formatted source code to show execution flow and code connections; and
   displaying the execution-centric formatted source code with the symbolic annotations to a user for analysis.

2. The computer-readable storage medium of claim 1, further having computer-executable instructions for causing a computer to perform steps comprising:
   symbolically annotate the execution-centric source code to show execution flow, the annotations comprising execution sequence numbers, source line numbers for an original source file, indicators to show lines that actually executed, a symbol to show a return from a method or a symbol to show a call to a method.

3. The computer-readable storage medium of claim 1, further having computer-executable instructions for causing a computer to perform steps comprising:
symbolically annotate the execution-centric source code to show code connections.

4. The computer-readable storage medium of claim 1, wherein the at least one the other events comprises an out-of-band event.

5. The computer-readable storage medium of claim 4, wherein the out-of-band event comprises a garbage collection event, a file being written to disk, a web site being accessed or a call to an external web service.

6. A method of creating an execution-centric view of source code comprising the steps of:
processing trace data to determine which code addresses were executed during a prior execution of an application;
while processing the trace data, identifying one or more events that happened at one or more points in time as the application was executed;
correlating the one or more events to corresponding parts of the source code;
mapping addresses in the trace data back to source code through symbol information;
reconstructing the source code into an execution-centric format, the execution-centric format lists the source code in an order in which it was executed;
symbolically annotating the execution-centric formatted source code to show execution flow and code connections; and
displaying at least a portion of the execution-centric formatted source code with the one or more events at a line of the portion of the execution-centric formatted source code where the one or more events occurred at a same point in time to a user for analysis.

7. The method of claim 6, wherein the trace data was collected at runtime.

8. The method of claim 6, wherein the addresses are mapped back to the source code using symbol information.

9. A computer-readable storage medium having computer-executable instructions for causing a computer to perform the steps recited in claim 6.

10. A computing device comprising:
a processing unit coupled to a memory, the memory comprising computer-executable instructions for causing the computing device to:
process trace data to determine which code addresses were executed during a prior execution of an application;
while processing the trace data, identify one or more events that happened at one or more points in time as the application was executed;
correlate the one or more events to corresponding parts of the source code;
map addresses in the trace data back to source code through symbol information;
reconstruct the source code into an execution-centric format, the execution-centric format lists the source code in an order in which it was executed;
symbolically annotate the execution-centric formatted source code to show execution flow and code connections; and
display the execution-centric formatted source code with the symbolic annotations to a user for analysis.

* * * * *